Patented Oct. 5, 1948

2,450,627

UNITED STATES PATENT OFFICE 2,450,627

MANUFACTURE OF TETRABASIC ACIDS

Herman S. Bloch, Chicago, Ill., assignor to Universal Oil Products Company, Chicago, Ill., a corporation of Delaware No Drawing. Application March 23, 1945,
Serial No. 584,505

13 Claims. (Cl. 260—514)

1

In broad principle the present invention relates to a process for the production of tetrabasic acids by the polymerization of the dicarboxylic adducts formed by the reaction of a dibasic acidic dienophile with a polyolefinic hydrocarbon containing conjugated unsaturation, in particular, the hydrocarbons contained in an organic diluent. More specifically the present invention relates to a process for the production of polycyclic unsaturated tetrabasic acids by the polymerization of the dicarboxylic adduct of an organic diluent with a dibasic dienophile such as maleic anhydride.

It is an object of my invention to provide a process for the manufacture of tetrabasic acids. It is another object of my invention to provide a process for the manufacture of tetrabasic acid amides, the tetrabasic acid being the product formed by polymerizing a dibasic dienophilic adduct of a cyclic polyolefinic hydrocarbon having isolated unsaturation and conjugated unsaturation, and treating the polymer to recover the acid. It is still another object of my invention to provide a process for the manufacture of tetrabasic acid esters by reacting the appropriate alcohol with a tetrabasic acid produced as hereinafter described.

A further object of my invention is to provide a process for the manufacture of compounds useful in compounding paints, in the preparation of resins and plastics, in the manufacture of siccatives, and for the production of other useful materials hereinafter more fully described.

In one embodiment my invention comprises a process for the manufacture of tetrabasic acids by the polymerization of the adduct formed by the reaction of a cyclic, conjugated, terpenic hydrocarbon with a dibasic, acidic dienophile, and the subsequent conversion of the polymeric product to the corresponding acid.

In another embodiment my invention comprises a process for the manufacture of tetrabasic acids by the polymerization of the adduct formed by the reaction of a dibasic dienophile with an organic diluent hydrocarbon, and the conversion of the polymer adduct to the corresponding acid compound.

In a specific embodiment, my invention comprises the process for the manufacture of tetrabasic acids by polymerizing in an aqueous alkaline medium the adduct formed by reacting a dibasic dienophile with an organic diluent hydrocarbon, and the conversion of the polymeric adduct to the corresponding acid compound by acidifying the aqueous alkaline polymerization medium.

A convenient and readily available source of hydrocarbons suitable in the process of the present invention and containing a number of polyolefinic hydrocarbons having isolated as well as conjugated unsaturation is the "organic diluent" hydrocarbons, hereinafter more fully described. Another source of polyolefinic hydrocarbons having cyclic, conjugated structures are certain members of the cyclic terpene series such as the sesquiterpenes, etc. Of the terpenes, the members of this series having isolated as well as conjugated unsaturation are especially desirable. Alkenyl derivatives of cyclic diolefins, such as 2-propenyl-cyclohexadiene-1,4 comprise materials utilizable as charging stocks for the reactions specified in the present invention. The hydrocarbon material referred to as organic diluent in this specification and in the claims of this invention comprise the highly unsaturated hydrocarbons or fractions thereof which are released from combination in catalyst-hydrocarbon sludges formed in certain hydrocarbon conversion processes, such as the hydrogen fluoride or sulfuric acid catalyzed alkylation reaction where, for example, an isoparaffin is alkylated with an olefin or other alkylating agent. Another convenient source of organic diluent hydrocarbons is the catalyst phase of a polymerization process in which a normally gaseous or a normally liquid olefin is contacted with a polymerizing catalyst, such as sulfuric acid. The catalyst phase of an aluminum chloride or boron trifluoride hydrocarbon alkylation or isomerization reaction is also rich in organic diluent hydrocarbons. The hydrocarbons contained in organic diluent are believed to be entrained and dissolved in the used catalyst or chemically combined with the catalyst in the form of complexes, and are released from the catalyst-hydrocarbon sludge combination by methods generally known for decomposing complexes of this type. The sludge, depending upon its source and prior treatment, may in some cases be made to yield the organic diluent product by hydrolysis with water, or with aqueous caustic solutions. In another typical method which is particularly applicable for the sludge obtained in hydrogen fluoride catalyzed hydrocarbon conversion processes the organic diluent is obtained by fractional distillation, the organic diluent being taken off from the column as an intermediate or bottom product, and anhydrous hydrogen fluoride as an overhead fraction.

In order to prepare organic diluent having a high degree of conjugated unsaturation a number of factors must be considered. The charging stock preferably comprises olefins, high boiling isoparaffins (such as alkylate bottoms) or a mixture of olefins and saturated substantially nonbenzenoid hydrocarbons containing tertiary hydrogen atoms. As the temperature at which the hydrocarbon-catalyst complex is treated is increased and the time is extended, the amount of conjugated unsaturation in the organic diluent is decreased and may disappear almost completely. To avoid this, reaction conditions must be sufficiently controlled to prevent large increases of temperature for extended contact periods, although the conditions at which a catalyst phase is formed which contains the desired polyolefinic cyclic compounds are flexible within the ranges indicated below.

When employing hydrogen fluoride as the catalyst in a hydrocarbon conversion process producing organic diluent the reaction temperatures will range from about —20° to about 150° C. With aluminum chloride, temperatures from about 25° to about 125° C. are preferred, while with sulfuric acid, the temperatures used are generally slightly lower than for aluminum chloride because of the oxidizing effect of sulfuric acid at the higher temperatures.

In general, the organic diluent which is a most convenient source of starting materials utilizable in the preparation of the compositions of my invention comprises a series of high molecular weight cyclic compounds of wide boiling range but generally homologous structure of which a large proportion contains conjugated olefinic double bonds, though the exact composition of the organic diluent will vary somewhat depending upon the particular charging stock, the catalyst and the conditions of operation employed. Infra-red and ultraviolet absorption studies of the organic diluent as well as other analytical data have shown that the cyclic dienes contained therein have isolated unsaturation in addition to the conjugated unsaturation, and that the four carbon atoms which constitute the conjugated system are highly substituted, possessing, on the average, fewer than two hydrogen atoms per mol as substituents, that is, some of the cyclic polyolefinic hydrocarbons present in organic diluent contain conjugated diolefin units of four carbon atoms joined by alternate double and single bonds and each of said units has four substituents, not more than two of which are hydrogen. Diolefin units of this nature may thus be represented by the general formula:

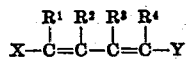

in which X and Y represent other parts of the cyclic polyolefin molecule and $R^1$, $R^2$, $R^3$, and $R^4$ represent substituents as hydrogen, an alkyl group, an alkenyl group, a cycloparaffin group, a cyclo-olefin group, etc.

The organic diluent which I prefer has a wide boiling range of about 150 to over 450° C., density of about 0.83 to about 0.93, index of refraction of about 1.47 to about 1.53 (but usually 1.48 to 1.50), specific dispersion of about 125 to about 175 (but usually between 135 and 145), bromine numbers above about 140 (although they vary considerably with the average molecular weight), maleic anhydride values of about 30 to about 90 (usually in the range of about 45 to 75), acid number below 3, average number of olefinic double bonds per molecule varying between about 2.5 and about 4, of which from about 40 to about 70 percent are conjugated, and average molecular weights from about 200 to about 400, although the usual average is in the neighborhood of 300. Organic diluent fractions comprising compounds having molecular weights of as low as about 150 to as high as about 1000 have also been prepared. Although hydrogen to carbon atomic ratios of the organic diluent vary somewhat depending upon the particular source of the material, for an organic diluent derived from a hydrogen fluoride catalyst phase they range from about 1.67 to about 1.72 (for the various fractions) with the actual weight percentages of hydrogen varying from about 12.35 to about 12.6. In the case of organic diluent recovered from an aluminum chloride catalyst phase the hydrogen to carbon atomic ratios range from about 1.58 to about 1.72 with the actual weight percentages of hydrogen averaging about 12.4.

The properties of the organic diluent will, of course, vary somewhat depending upon whether the entire boiling range of material or a specific fraction is employed. In general, the lower boiling fractions have similar properties regardless of the particular catalyst phase from which they are derived and are water-white to straw-yellow in color. The higher boiling fractions are in general somewhat darker and differ more widely, those derived from hydrogen fluoride catalyst phases being substantially non-aromatic and partly bi- or dicyclic, while those derived from catalyst complexes formed in reactions involving such catalysts as aluminum chloride or sulfuric acid contain a certain amount of aromatic hydrocarbons. More desirable final products are often obtained by using distillate fractions of the organic diluent. The distillation may be conducted under vacuum, with steam, or at atmospheric pressure, the latter being carried out very rapidly. Although the present specification and claims are directed primarily to the use of the whole boiling range of material, it is to be understood that the treatment described also covers the use of specific fractions.

To prepare the organic diluent, a hydrocarbon charge containing normally gaseous and/or normally liquid olefins is treated in the presence of hydrogen fluoride under sufficient pressure to maintain a substantial portion of the mixture in liquid phase, said pressure usually being below about 35 atmospheres. Intimate contact between the hydrocarbon and catalyst may be maintained by some form of agitation such as mixing, stirring, etc., so as to form a mixture or emulsion of hydrocarbon and hydrogen fluoride. The reaction temperature may be from about —20° to about 150° C. and preferably from about 10° to about 100° C. Upon completion of the reaction, the products are allowed to settle and a hydrocarbon layer is separated from the catalyst layer. The catalyst phase which comprises chiefly acid and organic diluent is directed to an acid recovery zone wherein hydrogen fluoride is separated by distillation, treatment with water or aqueous hydrogen fluoride, or other suitable means. The hydrogen fluoride may then be recovered in anhydrous form and recycled to the reaction zone.

The effect of varying the time, temperature and pressure at which the catalyst-hydrocarbon complexes are treated to recover the organic diluent, as well as the manner of recovery and the degree of recovery by distillation, may be seen from the following table:

| Method of Recovery | Aqueous Hydrolysis | Distillation | Rapid Distillation | Vacuum Distillation |
|---|---|---|---|---|
| Maximum reactor temperature, °C | | 149 | to 80 | 59 |
| Pressure, mm | 760 | 760 | 760 | 90–102 |
| Time, hours (total) | | 25.8 | 1.8 | 11.75 |
| Percent of HF Recovered by Distillation [1] | 0 | 87.5 | 64 | 54 |
| Properties of organic diluent: | | | | |
| Molecular weight | 290 | 369 | 336 | 308 |
| Bromine number | 181 | 91 | 147 | 158 |
| Number of double bonds/Mol | 3.3 | 2.1 | 3.1 | 3.0 |
| Diene Number | 82 | 5 | 50.7 | 53.5 |
| $d_4^{20}$ | 0.859 | 0.896 | 0.885 | 0.890 |
| $nD^{20}$ | 1.4846 | 1.5023 | 1.5050 | 1.5037 |

[1] Remainder removed by water-washing.

As can be seen readily from the data, the amount of conjugated unsaturation present in the organic diluent was greatly decreased when treatment was conducted more slowly and at the higher temperatures and pressure, and the most highly unsaturated product was recovered by aqueous hydrolysis alone.

The material remaining after removal of hydrogen fluoride is then treated to remove any traces of free acid left and to obtain a purified organic diluent, for example, by either steam or vacuum distillation, or by further water or alkali washing. If desired, the fluidity of the organic diluent may be increased by commingling it with a non-reactive hydrocarbon solvent, such as pentane, and after thorough mixing the solution may be treated with an alkaline reagent to neutralize any free acid present. The treated mixture is then directed to a separation zone in which the hydrocarbon solvent is removed by suitable means, such as distillation, and the desired product recovered. The organic diluent may be used in this form or may be further treated to improve its color by contact with a solid absorbent, by distillation as described above (preferably with steam or in vacuo) or by mild acid and clay treatment.

The first step in the process of this invention is essentially a reaction of the type commonly known as a Diels-Alder reaction. A typical equation for the reaction taking place during this process and the structural formula of representative hydrocarbons contained in organic diluent may be written as follows:

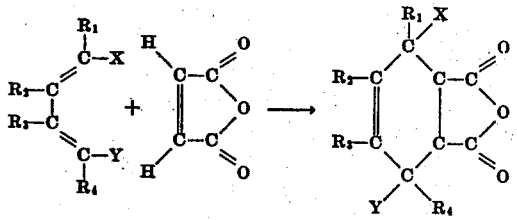

where

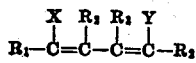

represents a typical conjugated diene hydrocarbon present in the organic diluent derived from the catalyst sludge recovered from a hydrocarbon conversion process, as previously defined and described. Maleic anhydride was chosen to represent the dibasic dienophilic anhydride but other dibasic acidic dienophiles such as fumaric, mesaconic, citraconic, or itaconic acids, their esters, anhydrides, amides, or nitriles may be used, although not necessarily with equivalent effectiveness.

In the process of my invention organic diluent hydrocarbons or specific terpenic compounds are mixed with the anhydride of the desired dienophile such as maleic anhydride and heated to temperatures of about 50° to about 175° C. until a sample of the hydrocarbon recovered from the reaction mixture has a diene value of approximately 0. The proportion of maleic anhydride to hydrocarbon will vary, depending upon the characteristics of the hydrocarbon (that is its diene number or percent of conjugated unsaturation), and the end product desired. If an amount of maleic anhydride, equal to or less than the stoichiometric quantity which will react with the conjugated dienic linkages in the hydrocarbon (as shown for example by the diene value) is used and the resultant mixture of adduct and unreacted hydrocarbon polymerized according to the conditions set forth below, the resultant product comprises a mixture of the tetrabasic acidic product with unreacted hydrocarbon material. It is preferable however, when a maximum yield of product (tetrabasic acids) is desired, to mix the calculated quantity of dienophile or a slight excess thereof with a predetermined molecular proportion of the hydrocarbon constituent, the number of conjugated linkages and the approximate molecular weight of the hydrocarbon being determined prior to carrying out the reaction.

Upon completion of the primary reaction involved in the process of this invention, that is, the reaction of the high molecular weight organic diluent hydrocarbons or other hydrocarbon material with the acid anhydride as represented by the above equation, an acid anhydride adduct is formed. This primary product, which comprises the starting material for the subsequent polymerization reaction, is characterized by the fact that in its structure is contained further unsaturation, although not necessarily conjugated dienic linkages. The acids formed by hydrolysis of the adduct may be characterized as unsaturated alicyclic dibasic acids of which one of the carboxylic acid groups is weakly acidic. Titration of such acids in the presence of phenolphthalein as indicator, therefore, gives neutralization equivalents approximately equal to the molecular weight. Electrometric titrations of such acids indicate that one carboxyl group is neutralized at pH of 10 to 11, while the second group is neutralized at a pH above about 12.0. Determinations of the neutralization equivalent by titration with phenolphthalein as an indicator were made of several representative adduct acids and values were found which varied between about 300 and about 600 and corresponded closely to the molecular weights of the acids as determined cryoscopically.

The product formed in the above mentioned primary reaction may be utilized directly as an intermediate for many useful products, or may be charged as such into further conversion reactions as described herein, or may at this stage be improved in regard to purity and composition before further utilization. Such improvements may consist of fractionation or a selective extraction treatment to separate the desired adduct from unreactive material and by-products of the reaction. The by-products and unreactive material may include hydrocarbons having non-conjugated double bonds and it may be preferable, depending upon the use to which the final product is to be put, to separate these from the adduct before proceeding to subsequent process treatments which comprise this invention.

The secondary stage of the process of this invention is essentially a polymerization reaction in which the dicarboxylic dienophilic adduct, referred to above as the product of the primary reaction, is subjected to reaction conditions which result in the conversion of the dibasic adduct to a polymer which comprises tetrabasic acids and is believed to be principally a dimer.

The starting materials for the polymerization reaction include the adducts formed by the above mentioned Diels-Alder reaction between the conjugated dienic hydrocarbon or hydrocarbons and a dicarboxylic dienophile, its anhydride, amide, diamide, ester, di-ester or nitrile. The charging stock may be a highly purified adduct containing only reactive materials or may comprise a major proportion of adduct containing minor amounts of impurities such as unreacted hydrocarbons including those which do not have the requisite conjugated dienic linkages for the primary reaction. Depending upon the ultimate utilization of the final product, the charging stock may or may not receive an intermediate purification treatment. A product to be used, for example, in the compounding of paint vehicles would not necessarily demand rigid purification, since, if the product contained unreacted unsaturated hydrocarbons, these would form valuable drying oils in the composition of said paints.

Although the dibasic acidic adducts and their simple organic derivatives (i. e., the acids, anhydrides, esters, amides, nitriles, etc.) may be polymerized directly to some extent by the application of heat, I have found that the reaction of these materials is accompanied by considerable decomposition at temperature sufficiently high to induce polymerization, with a correspondingly lowered yield of the desired products. If, however, the derivatives of the dicarboxylic acid adduct, such as the esters, amides, anhydrides, etc. are polymerized directly, the corresponding derivatives of the tetrabasic acids are formed to some extent; these may be converted to the tetrabasic acids by conventional hydrolysis or saponification methods. On the other hand, the thermal treatment of the salts of the dibasic acids, particularly those of the strongly alkaline metals in aqueous solution or suspension, effects polymerization with little or no recarboxylation. I therefore prefer to effect the polymerization of the dibasic acidic adducts in the presence of an excess of aqueous alkali, and to recover the polybasic acidic products from the reaction mixture by acidification of the mixture of reaction product with a strong mineral acid, such as, for example, hydrochloric acid, sulfuric acid, phosphoric acid, and the like.

I have found that the polycarboxylic acid polymers so recovered contain an average of four acid groups per mole which are strongly acidic, whereas the monomeric dicarboxylic adduct of the primary reaction when titrated with a strong base exhibited but one weakly acidic group per molecule; and I believe that the polymerization reaction is principally one of dimerization, although there is also evidence of the presence of higher polymers.

The preferred medium in the presence of which the polymerization reaction of the dicarboxylic adduct proceeds to completion to form the tetrabasic acid salt, consists of metallic hydroxides, either of the strong alkali metals or the weaker alkaline earth metals. These are dissolved or suspended in water to give a solution or mixture which will remain alkaline throughout the reaction period. Although an aqueous solution of the hydroxides of the strong alkali metals are preferable for carrying out the polymerization and hydrolysis reactions because of their superior solubilities in water at substantial concentrations, the hydroxides of the alkaline earth metals may also be used. An aqueous solution of sodium or potassium hydroxide was found to give excellent yields of product under mild reaction conditions.

Reaction temperatures of from about 100° to about 350° C. result in polymerization, although temperatures in the neighborhood of from about 200° to about 250° C. are preferred. Concentrations of the alkali in water may vary between that just sufficient for complete neutralization of the acid to quantities many times this neutralization concentration; in general, a substantial excess of alkali is preferred.

The high molecular weight tetrabasic acids formed as a product in the process of my invention, or by the hydrolysis of the tetrabasic acid derivatives also obtainable as products in the process of my invention, may be further reacted in a number of ways to form resins of various characteristics, surface-active agents, siccatives, etc. For example, in the preparation of valuable resins, a tetrabasic acid may be esterified in a number of known methods for such reactions with glycerine, pentaerythritol or other polyhydric alcohols to form clear, light-colored, alkyd resins. Valuable products may also be prepared by the use of amino alcohols or of dihydric alcohols such as, for example, ethylene glycol or polyethylene glycol. These polyesters of the tetrabasic acids with glycols are thermo-setting resins unlike the products obtained from glycols and dibasic acids, which are thermoplastic. If desired, a number of other organic acids or alcohols may be added to the reaction mixture to form valuable modified resins of the tetrabasic acid reaction products. Thus, a relatively small percentage of these tetrabasic acids may be said to impart thermo-setting properties or increased hardness to alkyd resins prepared from glycols and dibasic acids such as phthalic anhydride, dimers of unsaturated fatty acids, etc. Unsaturated alcohols, either alone or in combination with glycerine, may be used to esterify the tetrabasic acids formed by the process of my invention to yield modified resins which have air-drying properties or which may be further polymerized to make thermosetting or thermoplastic resins suitable for use as plastics and laminating materials. Thus their allylesters or crotylesters may be heat polymerized to form hard thermosetting resins while mixed allyl-saturated alcohol esters made with minor amounts of the unsaturated alcohol are thermoplastic. To form a resin of increased solubility in paint and varnish solvents, the esterification reaction may be stopped short of completion and the final setting may be effected by a baking step.

The aliphatic and alicyclic hydrocarbon chains attached to the carboxyl group of the tetrabasic acids (denoted by $R_1$, $R_{2_1}$, $R_{3_1}$ and $R_4$ of the above structural equations) contain unsaturated linkages which make their resinous derivatives particularly suitable for incorporation in airdrying paints and varnishes. The extent of this desirable unsaturation may be sufficient in some cases for the particular use to which the resin may be put; however, the solubility of the alkyd resins formed by the reaction of the tetrabasic acids and polyhydric alcohols and their air-drying and baking properties may be improved by incorporating in the esterification mixture certain unsaturated fatty acids or their partial esters such as those derived from natural glyceride oils (e. g. linseed oil, soybean oil or tung oil). If a softer resinous material is desired, saturated fatty acids such as stearic or palmitic acids may be co-esterified with polyhydric alcohols in the presence of the tetracarboxylic acids of my invention. These saturated fatty acids also increase the solubility and flexibility of the resins and form products which are excellent plasticizers. Various other combinations of esterified tetracarboxylic acids with such materials as natural resins, phenolic resins, etc. will become apparent to those skilled in this art.

If it is desired to manufacture surface-active compounds from the product of the present invention, these may be prepared from the water-soluble salts of the tetra-carboxylic acid and particularly the alkali salts, salts of ammonia, or of strong, dibasic, poly-substituted amines (including alkyl, aryl and alicyclic amines) and amino alcohols.

Another type of material which may be formed from the tetrabasic acid derived from the process of this invention comprises siccative compounds. These are formed by reacting the said acids with metal oxides, acetates, carbonates, etc., the metals including cobalt, vanadium, manganese, lead, iron, chromium, mercury, tin, bismuth, cerium, thorium, aluminum, zinc, copper, nickel and cadmium. They may also be formed by precipitation through the addition of water-soluble salts of these metals to solutions of the soluble salts of the tetrabasic acids. These may be compounded and modified in accordance with the general practice relating to this art.

The process of the present invention embodies, in addition to the actual tetrabasic acid formed by the polymerization of the adduct of organic diluent hydrocarbons and a disbasic acidic dienophilic group, those derivatives of the acid normally considered to be reaction products of an organic acid with an acid-reactive organic compound. Such derivatives include mono- and polyesters or mono-hydric saturated or unsaturated alcohols such as methanol, ethanol, etc., or vinyl, allyl, etc. alcohols, mono- and polyamides, esters of polyhydric alcohols such as ethylene glycol, glycerine, etc., and reaction products of aminoalcohols such as ethanolamine, diethanolamine, etc.

The following example of a representative process of my invention is given merely for the purpose of illustration and is not intended to limit the scope of the invention in accordance with the example cited:

*Example I.*—A polymer gasoline having the properties listed in the following table was reacted with hydrogen fluoride and the catalyst phase treated as hereinafter set forth to recover the organic diluent which was utilized in the reaction with maleic anhydride.

| | |
|---|---:|
| API gravity at 60° F | 67.1 |
| $d_{60}^{60}$ | 0.7125 |
| Bromine number | 133 |
| Molecular weight (calc.) | 99 |
| Engler distillation: | |
| IBP., °F | 81 |
| 10% over | 140 |
| 30 | 207 |
| 50 | 232 |
| 70 | 276 |
| 90 | 374 |
| E. P. | 413 |

The hydrocarbon charge was reacted with the hydrogen fluoride at a temperature of 78° C., pressure of 143 pounds per square inch gauge and a polymer gasoline to acid ratio of 4.23. After completion of the reaction, the products were separated into a hydrocarbon layer and a catalyst layer, and the latter was hydrolyzed with water to yield organic diluent having the following properties.

| | |
|---|---:|
| Density ($d_4^{20}$) | 0.859 |
| Index of refraction ($n_D^{20}$) | 1.4846 |
| Specific dispersion | 138 |
| Molecular weight | 290 |
| Bromine number | 181 |
| Diene value | 82 |
| Gardner color | 11–12 |
| Acid number | 0.14 |
| Number of double bonds per mol | 3.3 |
| Number of conjugated double bonds per mol | 1.9 |
| Organic fluoride, per cent | 0.51 |

The organic diluent was refluxed for 6 hours at 80° C. with a 5% excess over the theoretical amount of maleic anhydride, and the adduct was separated from the unreacted maleic anhydride by treatment with a hot dilute aqueous sodium hydroxide solution and subsequent precipitation of the adduct acids by acidification of the alkaline solution with sulfuric acid.

The maleic anhydride adduct acids of the organic diluent, which had as a neutralization equivalent of 524 were heated in a bomb with approximately equal parts of water and potassium hydroxide for 4 hours at 220° C. The product was diluted with water and the alkaline solution extracted with petroleum ether. Acidification of the aqueous phase yielded brittle solid acid of molecular weight (cryoscopic) 1000 and neutralization equivalent, 260; it was clearly tetrabasic. The extract after removal of the solvent, comprised essentially neutral material of acid number 5.

*Example II.*—A fraction of the organic diluent used in Example I boiling at 320–370° C. and having a molecular weight of 320 and a diene value of 66 was converted to its maleic adduct acids as in Example I. These acids, which were contaminated with hydrocarbon material as shown by their molecular weight of 470 and neutralization equivalent of 580, were heated in a bomb with approximately equal parts of potassium hydroxide and water for three hours at 225° C. The acidic product was recovered and separated from inert material as in Example I. It was a low-melting solid of molecular weight (cryoscopic) 1410 and neutralization equivalent 355±50 (by electrometric titration). The uncertainty in the latter quantity arose from the relatively gradual rise of the titration curve during the period of neutralization and the consequent uncertainty as to the exact end-point. It is clear, however, that polymeric acids of tetrabasic nature were formed in the process.

I claim as my invention:

1. A process for manufacturing a tetrabasic acid which comprises heating at a temperature of from about 100 to about 350° C. in the presence of an aqueous alkaline reagent the adduct of a dienophilic dibasic acidic compound and a cyclic polyolefinic hydrocarbon containing isolated unsaturation and at least some conjugated unsaturation, and acidifying the polymer product formed in the said seating step to form said tetrabasic acid.

2. The process which comprises polymerizing and hydrolyzing the adduct of maleic anhydride and a cyclic conjugated polyolefinic hydrocarbon by reacting said adduct in the presence of an aqueous alkaline solution at a temperature of from about 100° to about 350° C. and acidifying the resultant polymeric acid salt to form a tetrabasic acid.

3. The process of claim 1 further characterized in that said cyclic polyolefinic hydrocarbon is obtained by reacting an olefinic hydrocarbon in the presence of a hydrocarbon conversion catalyst selected from the group consisting of hydrogen fluoride, sulfuric acid, aluminum chloride, and boron trifluoride, and separating said cyclic polyolefinic hydrocarbon from the resultant catalyst-hydrocarbon sludge.

4. The process of claim 2 further characterized in that said alkaline solution comprises potassium hydroxide.

5. The process of claim 2 further characterized in that said alkaline solution comprises sodium hydroxide.

6. In the production of a tetrabasic acid by the polymerization and hydrolysis of a dibasic dienophilic adduct of a cyclic polyene containing conjugated unsaturation, the improvement which comprises reacting said adduct with an aqueous solution of a metallic hydroxide selected from the group consisting of the alkali metal and alkaline earth metal hydroxides at a temperature of from about 100° C. to about 350° C., and acidifying the resultant polymerization product to obtain free tetrabasic acid.

7. The process of claim 6 further characterized in that said temperature is from about 200° C. to about 250° C.

8. The process of claim 6 further characterized in that said resultant polymerization product is reacted with a strong mineral acid.

9. The process of claim 6 further characterized in that said metallic hydroxide comprises sodium hydroxide.

10. The process of claim 6 further characterized in that said metallic hydroxide comprises potassium hydroxide.

11. A process for the production of a tetrabasic acid which comprises reacting a dienophilic dicarboxylic acid anhydride with a cyclic polyene containing conjugated unsaturation to form the corresponding Diels-Alder adduct, reacting said adduct with an aqueous solution of a metallic hydroxide selected from the group consisting of the alkali metal and alkaline earth metal hydroxides at a temperature of from about 100° C. to about 350° C., and acidifying the resultant polymerization product to obtain free tetrabasic acid.

12. A process for the production of a tetrabasic acid which comprises reacting maleic anhydride with a cyclic polyene containing conjugated unsaturation to form the corresponding Diels-Alder adduct, reacting said adduct with an aqueous solution of a metallic hydroxide selected from the group consisting of the alkali metal and alkaline earth metal hydroxides at a temperature of from about 100° C. to about 350° C., and acidifying the resultant polymerization product to obtain free tetrabasic acid.

13. The process of claim 11 further characterized in that said cyclic polyene comprises an unsaturated hydrocarbon fraction having a boiling range of from about 150° C. to about 450° C., a density of from about 0.83 to about 0.93, an index of refraction of from about 1.47 to about 1.53, a specific dispersion of from about 125 to about 175, a bromine number above about 140, a maleic anhydride value of from about 30 to about 90, an acid number below 3, an average molecular weight of from about 200 to about 400, and an average number of olefinic double bonds per molecule of from about 2.5 to about 4 of which from about 40 to about 70% are conjugated.

HERMAN S. BLOCH.

REFERENCES CITED

The following references are of record in the file of this patent:

UNITED STATES PATENTS

| Number | Name | Date |
|---|---|---|
| 1,944,731 | Diels et al. | Jan. 23, 1934 |
| 1,985,601 | Dahlen et al. | Dec. 25, 1934 |
| 2,055,456 | Eichwald | Sept. 22, 1936 |
| 2,104,956 | Stern | Jan. 11, 1938 |
| 2,137,993 | Whipple | Nov. 22, 1938 |
| 2,230,005 | Moser | Jan. 28, 1941 |
| 2,262,002 | Hopff et al. | Nov. 11, 1941 |
| 2,297,039 | Van Melsen | Sept. 29, 1942 |

FOREIGN PATENTS

| Number | Country | Date |
|---|---|---|
| 810,125 | France | Mar. 15, 1937 |

OTHER REFERENCES

Farmer et al., Jour. Chem. Soc. (London), 1940, pp. 1339–1346.

Bachman et al., Jour. Am. Chem. Soc., vol. 64, pp. 787–790 (1942).